United States Patent Office 3,210,354
Patented Oct. 5, 1965

3,210,354
AZIDO-PYRIDAZONES
Franz Reicheneder, Ludwigshafen (Rhine), Germany, Karl Dury, deceased, late of Kirchheimbolanden, Germany, by Johanna Maria Dury, heiress-at-law, Kirchheimbolanden, Germany, and Adolf Fischer, Mutterstadt, Pfalz, and Herbert Stummeyer, Limburgerhof, Pfalz, Germany, assignors to Badische Anilin- & Soda-Fabrik Aktiengesellschaft, Ludwigshafen (Rhine), Germany
No Drawing. Original application July 13, 1964, Ser. No. 382,411. Divided and this application Dec. 30, 1964, Ser. No. 422,884
Claims priority, application Germany, Nov. 17, 1961, B 64,828
4 Claims. (Cl. 260—250)

This application is a divisional application of our copending application Serial No. 382,411, filed July 13, 1964, which in turn is a continuation-in-part of our application Serial No. 234,238, filed October 30, 1962, now U.S. Patent No. 3,157,646.

It is known to use pyridazone derivatives to influence plant growth. Known compounds for this purpose have the disadvantage, however, that a considerable period elapses after their use before their effect becomes evident.

We have now found that agents which contain a pyridazone of the general formula:

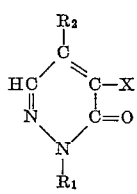

in which X denotes a halogen atom, especially a chlorine atom, $R_1$ denotes a substituted or unsubstituted alkyl, phenyl or cycloalkyl radical especially cyclohexyl, and $R_2$ is azido, are free from the said disadvantage.

The agents according to this invention have the advantage that they can more easily be emulsified in water than known agents.

The agents have good selectivity in respect of weeds among cultivated plants, for example onions or sugar beet, and take effect rapidly, i.e., only a short time after their use. Furthermore their after-effect in the soil is of short duration. Rapid crop rotation is therefore possible. The agents according to this invention may also be used in suitable dosage for the total destruction or inhibition of undesired plant growth. For this purpose they may be used in amounts of about 1 to 10 kg. of active ingredient per hectare.

Agents according to this invention may furthermore be used to achieve other influences on plant growth, especially for dehydration, acceleration of ripening by premature desiccation, for example in potato crops, and also for reducing fruit setting, retarding blossoming, and prolonging the harvest period and storage life.

The agents according to this invention may also be used in suitable concentrations as shoot promoting and root promoting agents.

The new pyridazone derivatives to be used according to this invention may be prepared by methods analogous to conventional methods. For example, reaction of 1-phenyl-4,5-dichloropyridazone (or the 1-lower alkyl or 1-cycloalkyl-4,5-dichloropyridazone) with sodium azide according to the general reaction described by Theodor Curtius, Berichte der deutschen chemischen Gesellschaft, 55, 1564 (1922), in a suitable solvent, e.g., alcohols, in particular ethanol, dimethylformamide or dimethylsulfoxide, yields 1 - phenyl - 4-azido-5-chloropyridazone-(6) (melting point 110° to 111° C.) or the corresponding 1-lower alkyl or 1-cycloalkyl compound. Analogous reaction of said dichloropyridazones with hydrazine hydrate according to the general reaction described by E. Meyer, Berichte der deutschen chemischen Gesellschaft, 33, 1885 (1900), in a suitable solvent, e.g., alcohols, in particular ethanol, dimethylformamide or dimethylsulfoxide, yields the 1-phenyl-4-hydrazino-5-chloropyridazone-(6) (melting point 172° C. with decomposition) or the corresponding 1-lower alkyl or 1-cycloalkyl compound. The aforesaid hydrazino compounds yield with nitrous acid in a suitable solvent, e.g., and aqueous acid solution, e.g., dilute hydrochloric acid or dilute sulfuric acid the corresponding azide according to the general reaction described by Theodor Curtius, Berichte der deutschen chemical Gesellschaft, 23, 3029 (1890). The above compounds may be used as herbicides in the form of the hydrochloride or hydrobromide salts.

A typical preparation of 1-phenyl-4-azido-5-chloropyridazone-(6) or the corresponding 1-methyl or 1-cyclohexly compound is the reaction of sodium azide in aqueous solution with 1-phenyl (or 1-methyl or 1-cyclohexyl)-4,5-dichloro-pyridazone-(6) in alcohols, in particular ethanol, dimethyl-formamide or dimethylsulfoxide at about 60° to 70° C.

Another typical preparation is the reaction of nitrous acid with the 1-phenyl (or 1-methyl or 1-cyclohexyl)-4-hydrazino-5-chloropyridazone-(6) at about 20° to 30° C. in an aqueous acid solution, e.g., dilute hydrochloric acid or dilute sulfuric acid. The hydrazino compound may be derived from the aforesaid 4,5-dichloropyridazone-(6) by reaction with hydrazine hydrate at about 60° C. in alcohols, in particular ethanol, dimethylformamide or dimethylsulfoxide.

A typical preparation of 1-phenyl-4-hydrazino-5-chloropyridazone-(6) or the corresponding 1-methyl or 1-cyclohexyl compound is the reaction of hydrazine hydrate with 1-phenyl (or 1-methyl or 1-cyclohexyl)-4,5-dichloropyridazone-(6) in alcohols, in particular ethanol, dimethylformamide or dimethylsulfoxide at about 60° C.

The following is a compound according to this invention:

1-phenyl-4-azido - 5 - chloropyridazone — melting point 110° to 111° C.

The invention is illustrated by, but not limited to, the following example.

*Example*

Soil is treated at the rate of 3 and 5 kg. per hectare with N - [4 - (1 - phenyl-5-chloropyridazone-(6)-yl-]N'-dimethylformamidine. The active substance is sprayed on the soil as an aqueous dispersion which has been prepared with an addition of a dispersing agent (sodium lignin sulfonate). Seeds of *Sinapis alba* (mustard), *Avena fatua* (wild oats), *Poa annua* (rye grass), *Beta vulgaris* (sugar beet), *Galium aparine* (cleavers), *Allium cepa* (onion), *Daucus carota* (carrots) are shown in the soil thus pretreated. At first the plants develop normally.

Six days later most of the plants begin to blanch from the tips of the leaves. After another three weeks, *Sinapis alba*, *Avena fatua*, *Poa annua*, and *Galium aparine* are practically completely withered. *Beta vulgaris* shows no damage whereas *Allium cepa* is only slightly bleached at the leaf tips.

Salts of the above formamidine, and also 1-phenyl-4-azido-5-chloro-pyridazone-(6) have a similar action.

What we claim is:
1. A compound selected from the group consisting of a compound having the formula

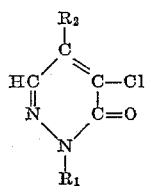

wherein, in said formula, $R_1$ represents a member selected from the group consisting of lower alkyl, phenyl and cyclohexyl, and $R_2$ is azido.
2. 1-phenyl-4-azido-5-chloropyridazone-(6).
3. 1-methyl-4-azido-5-chloropyridazone-(6).
4. 1-cyclohexyl-4-azido-5-chloropyridazone-(6).

No references cited.

NICHOLAS S. RIZZO, *Primary Examiner.*